US012273481B2

(12) United States Patent
Giorgio Gaggia et al.

(10) Patent No.: US 12,273,481 B2
(45) Date of Patent: Apr. 8, 2025

(54) MANAGING SERVICE INTERRUPTS IN LAWFUL INTERCEPTION

(71) Applicant: Telefonaktiebolaget LM Ericsson (publ), Stockholm (SE)

(72) Inventors: Antonio Giorgio Gaggia, Salerno (IT); Mariano Russo, Naples (IT); Dario Scudiero, Poggomarino (IT); Daniele Gaito, Naples (IT); Chiara Santella, Nocera Inferiore (IT); Carmine Galotto, Pagani (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 18/008,987

(22) PCT Filed: Jun. 9, 2020

(86) PCT No.: PCT/SE2020/050580
§ 371 (c)(1),
(2) Date: Dec. 8, 2022

(87) PCT Pub. No.: WO2021/251583
PCT Pub. Date: Dec. 16, 2021

(65) Prior Publication Data
US 2023/0216951 A1      Jul. 6, 2023

(51) Int. Cl.
*H04M 11/04* (2006.01)
*H04M 3/22* (2006.01)
(52) U.S. Cl.
CPC ................... *H04M 3/2281* (2013.01)

(58) Field of Classification Search
CPC .................................................. H04M 3/2281
See application file for complete search history.

(56) References Cited

U.S. PATENT DOCUMENTS

2003/0101356 A1    5/2003  Miettinen et al.
2011/0283011 A1*  11/2011  Li ........................... H04L 12/14
                                                              709/231

(Continued)

FOREIGN PATENT DOCUMENTS

WO      2018143845 A1    8/2018
WO      2019076424 A1    4/2019

OTHER PUBLICATIONS

Extended European Search Report for European Patent Application No. 20939577.1, mailed May 23, 2023, 10 pages.

(Continued)

*Primary Examiner* — Simon King
(74) *Attorney, Agent, or Firm* — Withrow & Terranova, PLLC

(57) ABSTRACT

A service interruption manager function, SIMF, receives information that indicates that lawful interception, LI, service interruption associated with an LI task has occurred. Based on the received information, a determination is made of a status regarding the LI service interruption associated with the LI task, for example a determination whether the LI service interruption associated with the LI task has a current status that is any of: terminated, ongoing or initiated. A message is then transmitted, to a delivery function, DF, via an HI2 interface, the message comprising at least the determined status regarding the LI service interruption.

16 Claims, 7 Drawing Sheets

(56) References Cited

U.S. PATENT DOCUMENTS

| | | | |
|---|---|---|---|
| 2012/0129517 A1* | 5/2012 | Fox | H04W 24/02 455/425 |
| 2013/0326631 A1 | 12/2013 | Cartmell et al. | |
| 2014/0073295 A1* | 3/2014 | Imbimbo | H04W 12/80 455/411 |
| 2016/0112261 A1* | 4/2016 | Amato | H04L 63/306 709/220 |
| 2018/0376384 A1* | 12/2018 | Youn | H04W 36/0011 |
| 2020/0077253 A1* | 3/2020 | Kim | H04W 76/30 |
| 2021/0014923 A1* | 1/2021 | Palat | H04W 76/19 |

OTHER PUBLICATIONS

Author Unknown, "Network Functions Virtualisation (NFV); Security; Report on NFV LI Architecture," Group Report NFV-SEC 011, Version 1.1.1, Apr. 2018, ETSI, 49 pages.

Author Unknown, "Lawful Interception (LI); Handover specification for IP delivery," Technical Specification 102.232, Version 1.5.1, Oct. 2006, ETSI, 44 pages.

Author Unknown, "Lawful Interception (LI); Internal Network Interfaces; Part 1: X1," Technical Specification 103.221-1, Version 1.6.1, Dec. 2019, ETSI, 44 pages.

Author Unknown, "LTE; 5G; Digital cellular telecommunications system (Phase 2+) (GSM); Universal Mobile Telecommunications System (UMTS); Lawful Interception (LI) architecture and functions," Technical Specification 133.127, Version 15.1.0, May 2019, ETSI, 56 pages.

International Search Report and Written Opinion for International Patent Application No. PCT/SE2020/050580, mailed Mar. 11, 2021, 13 pages.

International Preliminary Report on Patentability for International Patent Application No. PCT/SE2020/050580, mailed Aug. 18, 2022, 11 pages.

* cited by examiner

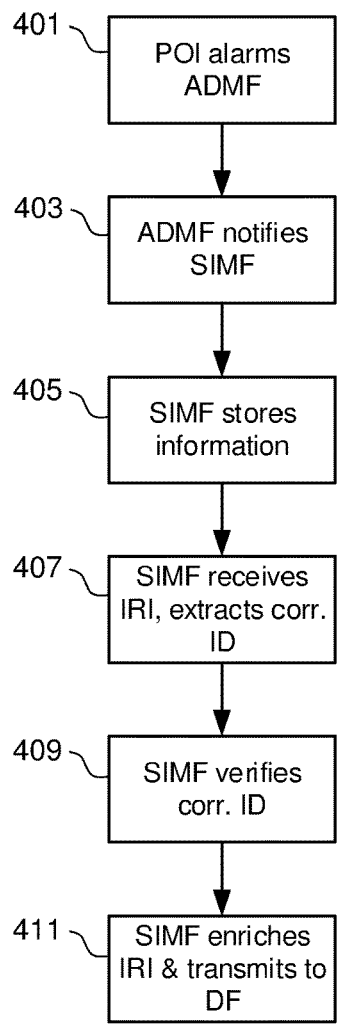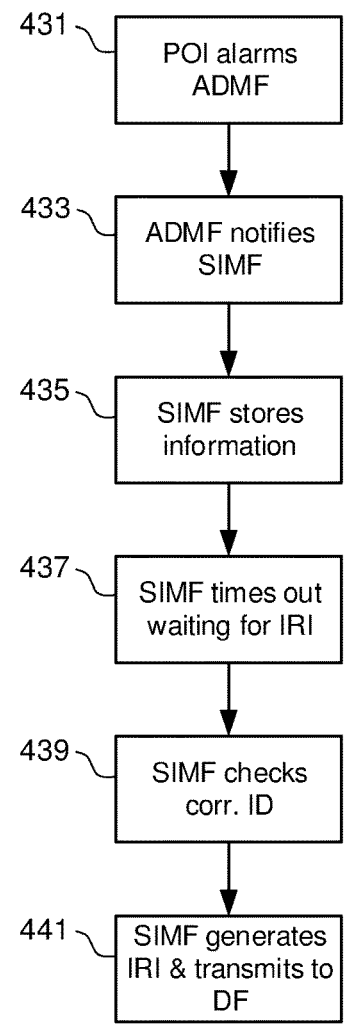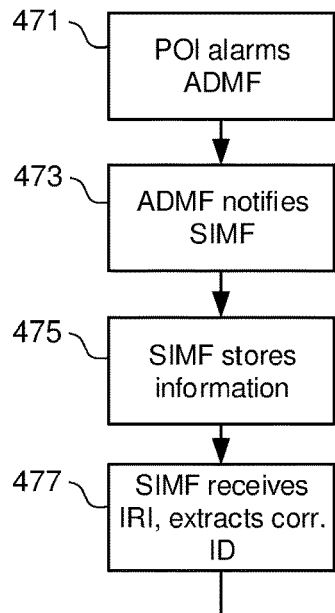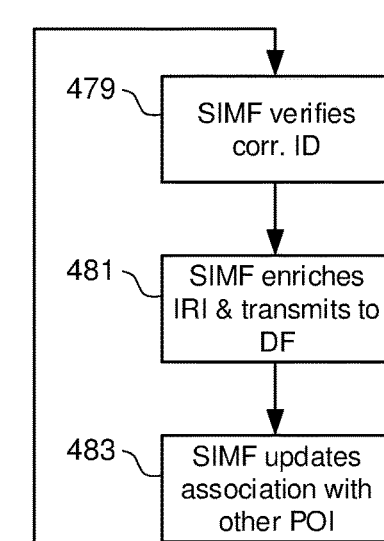
Fig. 4a
Fig. 4b
Fig. 4c

MANAGING SERVICE INTERRUPTS IN LAWFUL INTERCEPTION

This application is a 35 U.S.C. § 371 national phase filing of International Application No. PCT/SE2020/050580, filed Jun. 9, 2020, the disclosure of which is incorporated herein by reference in its entirety.

TECHNICAL FIELD

Embodiments herein relate to a method performed by a lawful interception function in a telecommunication network, a corresponding computer system as well as a computer program and a carrier of such a computer program.

BACKGROUND

Lawful interception (LI) of traffic between communicating entities in a telecommunication network involves interaction between several LI functions in a core network that is part of the telecommunication network. For the purpose of the present disclosure, it is enough to mention a few functions such as an LI administrative function (ADMF), a point of interception (POI) within a network element (NE), a mediation function (MF) and a delivery function (DF). The LI functions ADMF, MF and DF form part of what in the following is denoted LI mediation system. As will be exemplified further in the detailed description below, a NE in the present context is an entity in the core network that is involved in the communication activity that is subject to LI. Communication also takes place with one or more law enforcement agencies (LEA), which orders LI monitoring on LI functions by communication with the ADMF, and receives data associated with intercepted communication from the DF.

Communication between such entities, in a LI context, is subject to various standards in the form of technical specifications (TS) set by the European Telecommunications Standards Institute (ETSI), for example, the ETSI TS 102 232 V1.5.1 (2006-10) "Lawful Interception (LI); Handover specification for IP delivery".

One of the things that matters most to LEA's is the business continuity of the LI solution. A LEA therefore requires that the LI mediation system provides a high level of availability in terms of, e.g., minimization of system downtime (i.e. the length of time a LI service is unavailable beyond a maximum length of time) and data loss.

In physical network functions (PNFs), high availability (HA) is implemented with redundant hardware (i.e. computer processors) running redundant instances of each service. In case of failure of hardware running one instance of a service, or in case of a scheduled maintenance activity, the LI mediation system can then perform a failover procedure and switch to use another instance of a service that is running on hardware that did not fail.

In case of upgrade of the database management system (DBMS) in the LI mediation system, instead the LI mediation system must be switched off to guarantee data consistency. In these cases, i.e. SWITCHOVER, FAILOVER, SHUTDOWN/RESTART of the LI mediation system, the LI mediation system notifies these interruptions to the LEA over handover interface 2 (HI2). Moreover, the LI mediation system receives over X1 and X2 info on SWITCHOVER, FAILOVER, SHUTDOWN/RESTART of the POI and sends it to the LEA over HI2.

This interrupt information is important for the agency to understand. For example, it is important for the LEA to know what the consequences of the interruption has been on the LI monitoring already taking place, as well as what the consequences will be on continued LI. For example, in case of POI restart without warrant loss, according to the information received via HI2, the LEA should know that no action is needed and that no LI data has been lost, although eventually some intercept related information (IRI) may be lost during the restart of the POI. On the other hand, if the POI restart was connected also to a warrant loss, the LEA is informed that, until all warrants are re-sent to the POI by the ADMF in the LI mediation system, IRI can be lost.

In prior art telecommunication systems, prior to the evolution of virtualization and cloudification systems, failures in terms of interrupts such as those discussed above were due mainly to hardware faults, and the failure fixing required a switchover to new hardware, and sometimes also a human intervention to replace the hardware.

By the current evolution of virtualization of telecommunication systems, cloud environment and network function virtualization (NFV) standards introduce a substantial shift in the way telecommunication networks are implemented, thereby breaking the link between hardware and software in today's equipment. This is done through the use, on computer servers, of a software abstraction layer called virtualization layer or hypervisor, which allows creation of multiple virtual machines (VM) running different operative systems on the same computer server. With these new technologies, NFV, VM etc., the high availability issues are fully handled by the infrastructure in which the telecommunication system is realized.

In such cloud environments the LI functions are so-called virtualized network functions (VNF) that are decoupled from the hardware, so that the failure reasons and their effects are different from the ones that occur on the prior art PNFs. New events can occur, such as infrastructure faults, and other failure events are changed or not possible anymore. For example, a failure such as switchover is not possible when the high availability issue is totally handled by the infrastructure.

Consequently, failure information associated with PNFs are not applicable for VNFs and LEAs are therefore not able to understand what happened when a failure occurs or which consequences the failure has had or will have on the LI monitoring. This misalignment between the failure event and the reported information to the LEA will mean that the LEA is not informed that events, e.g. IRI and/or content of communication (CC), associated with objects subject to LI could have been lost.

SUMMARY

In view of the above, an object of the present disclosure is to overcome drawbacks related to failures related to LI service interruption. This object is achieved in a first aspect by a method performed by a service interruption manager function (SIMF) in a telecommunication network.

The SIMF, as well as an ADMF, a POI in a NE, an MF and a DF with which the SIMF communicates, as will be summarized below, are all VNFs in a cloud environment as described above.

The method of the first aspect comprises receiving information that indicates that LI service interruption associated with an LI task has occurred. Based on the received information, a determination is made of a status regarding the LI service interruption associated with the LI task, for example a determination whether the LI service interruption associated with the LI task has a current status that is any of:

terminated, ongoing or initiated. A message is then transmitted, to a DF via an HI2 interface, the message comprising at least the determined status regarding the LI service interruption.

The definition of LI service interruption associated with an LI task is to be understood as interruption in the LI service itself. This definition excludes "normal" communication between communicating entities, for example communication services such as media communication sessions that the communicating entities may be involved in and that are being subject of LI.

Such a method enables the DF to convey information about a LI service interruption to the LEA/a LEA device, via the HI2 interface, and thereby enabling the LEA to gain knowledge of the LI service interruption and take any mitigation action that may be necessary. As will be exemplified in the following, this means that the LEA may be kept informed when events on monitored objects (i.e. communicating entities that are subjects of LI) could be lost. Also, the LEA may be kept informed when LI monitoring is working again, after an interruption, without any malfunctions, and the LEA may gain knowledge regarding which problem occurred in relation to the communication between the POI and the LI mediation system.

In some embodiments, the receiving comprises receiving information that indicates that a POI in a NE has experienced LI service interruption associated with an LI task.

In some embodiments, the receiving comprises receiving, from an ADMF via an X1 interface, a message comprising the information that the POI has experienced LI service interruption associated with an LI task. In other embodiments, the receiving comprises receiving, from an MF via an X2 interface, a message comprising the information that the POI has experienced LI service interruption associated with an LI task.

In some embodiments, the receiving comprises receiving, from an ADMF, via an X1 interface, information that indicates that LI service interruption associated with an LI task has occurred.

In other words, various embodiments illustrate that handling of occurrences of LI service interruption may involve handling of interruptions occurring outside the LI mediation system, e.g. interruptions relating to the LI monitoring by the POI, as well as interruptions occurring inside the LI mediation system itself, e.g. interruptions in the ADMF, the MF or the DF.

In some embodiments, the receiving comprises receiving further LI service interruption information that informs about one or more effects of the LI service interruption. This further LI service interruption information comprises one or more of:

information that indicates a type of the LI service interruption,
information that indicates a status of at least one entity involved in the LI task that experiences the LI service interruption, and
information that indicates an impact on at least one entity involved in the LI task that experiences the LI service interruption.

In some embodiments, the transmitting to the DF comprises transmission of at least part of the further LI service interruption information.

In some embodiments, the determining of a status regarding the LI service interruption associated with the LI task comprises analysing at least part of the further LI service interruption information.

In some embodiments, the LI service interruption message is an OperationMessage of the ETSI technical specification 102 232 V1.5.1.

In a further aspect, there is provided a computer system comprising at least a processor and a memory, said memory containing instructions executable by said processor whereby said computer system is operative to perform a method as summarized above.

In yet a further aspect, there is provided a computer program comprising instructions which, when executed on at least one processor in a computer system, cause the computer system to carry out a method as summarized above.

In yet a further aspect, there is provided a carrier, comprising the computer program as summarized above, wherein the carrier is one of an electronic signal, an optical signal, a radio signal and a computer readable storage medium.

These further aspects and embodiments of these further aspects enable the same effects and advantages as summarized above in connection with the method of the first aspect.

DETAILED DESCRIPTION

Figure 1A:
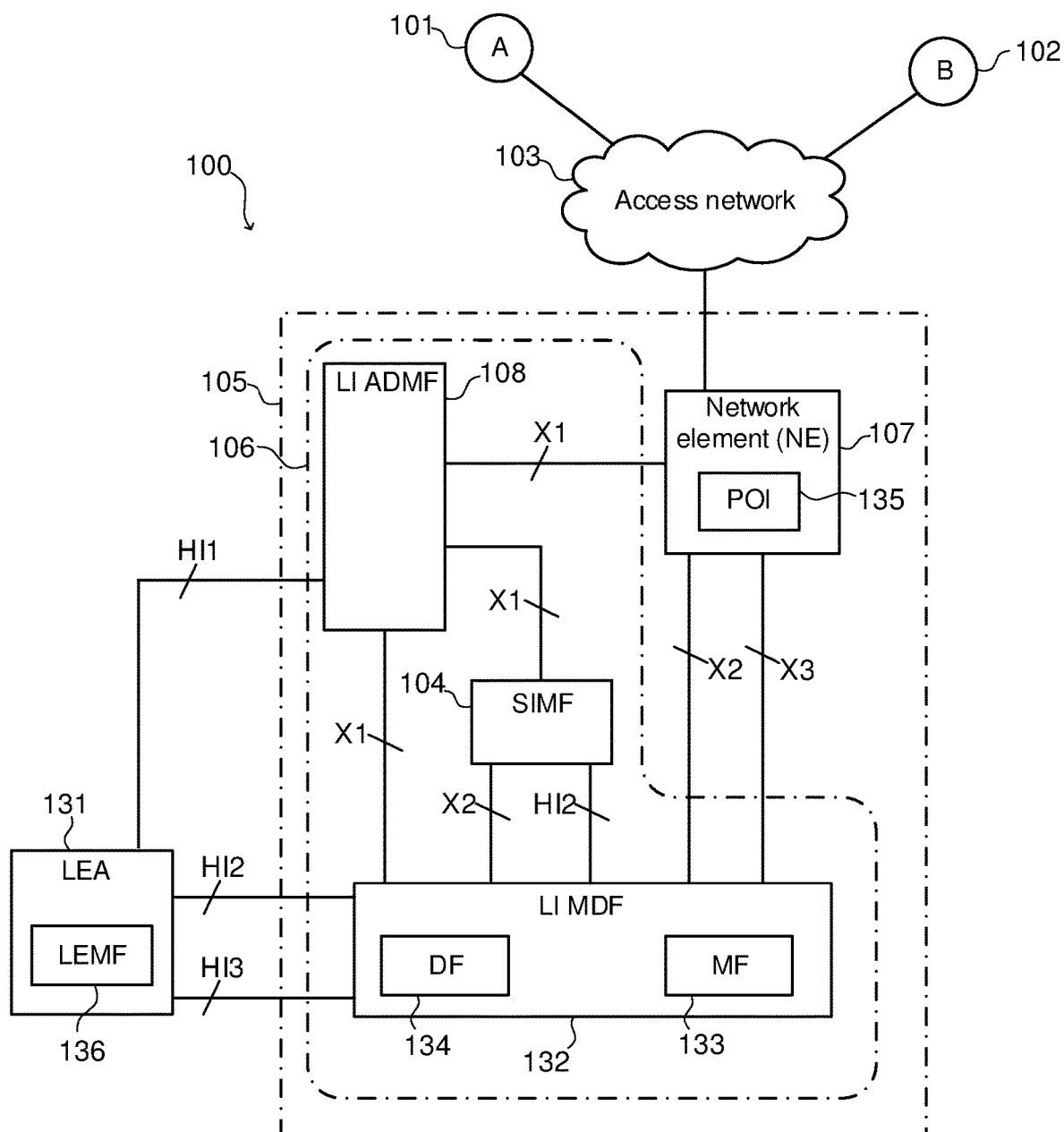
FIGS. 1a-b are schematically illustrated block diagrams of LI systems.

FIG. 1a schematically illustrates a first functional representation of a telecommunication network 100 comprising a core network 105 and an access network 103 in which two communicating entities, a first communicating entity 101 and a second communicating entity 102 are connected. The access network may, e.g., be in the form of a 3GPP radio access network (RAN) or any other type of non-3GPP communication network that may connect to the core network 105, which may be e.g. an Evolved Packet Core (EPC), a 5G core network (5GC) or any future core network in which the skilled person would understand that the invention can be implemented in.

As the skilled person will realize, communication performed by the first and second communicating entities 101, 102 is enabled by several functional units in both the access network 103 and the core network 105. For the sake of clarity of description, such functional units are not illustrated in full but only schematically represented and exemplified by a network element (NE) 107 that, in a 4G context (e.g. 3GPP Evolved Packet System (EPS), may be a mobility management entity (MME), a serving gateway (S-GW), a packet data network gateway (P-GW) etc. In a 5G context, the network element 107 may, e.g., be in the form of a policy control function (PCF), a user data management function (UDM), an Access and Mobility Management Function (AMF) or a session management function (SMF) etc. The network element may even be an SMS-Function (SMSF).

A common characteristic of such functional units, as represented by network element 107, in the core network 105 is that they may comprise LI functionality in the form of a point of interception (POI) 135. The POI 135 is in FIG. 1a thus depicted as being a part of the network element 107 or being embedded therein, but the POI 135 may also be separate from the network element 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108 (also called LI ADMF) and a mediation and delivery function (MDF) 132 that connects to a law enforcement agency (LEA) 131. Within the MDF 132 a mediation function (MF) 133 and a delivery function (DF) 134 are configured to handle an intercept product in the form of intercept related information (IRI) and content of communication (CC) received from the POI 135 and provide the IRI and CC to the LEA 131. The LEA 131 manages a LEA communication device in the form of a law enforcement monitoring facility (LEMF) 136, which receives IRI and CC from the DF 134. A service interruption manager function (SIMF) 104 connects to the ADMF 108 and the MDF 132 and it is configured to perform actions related to LI service interruption as discussed herein. As indicated above, an LI mediation system 106 as defined herein comprises the ADMF 108, the MF 133, the DF 134 and the SIMF 104.

Communication between the entities in the telecommunication system 100 takes place via X1, X2, X3, and HI2 interfaces. That is, the ADMF 108 communicates with the MF 133, DF 134, the POI 135 in the NE 107 and the SIMF 104 via the X1 interface. The POI 135 in the NE 107 communicates with the MF 133 via the X2 and X3 interfaces. The SIMF 104 communicates with the MF 133 via an X2 interface that is internal to the LI mediation system 106, and communicates with the DF 134 via the HI2 interface. The ADMF 108 also communicates with the LEA 131 via an HI1 interface and the DF 134 communicates with the LEMF 136 in the LEA 131 via HI2 and HI3 interfaces.

The NE 107, the POI 135, the ADMF 108, the MF 133, the DF 134 as well as the SIMF 104 are all VNFs as discussed above.

Figure 1B:
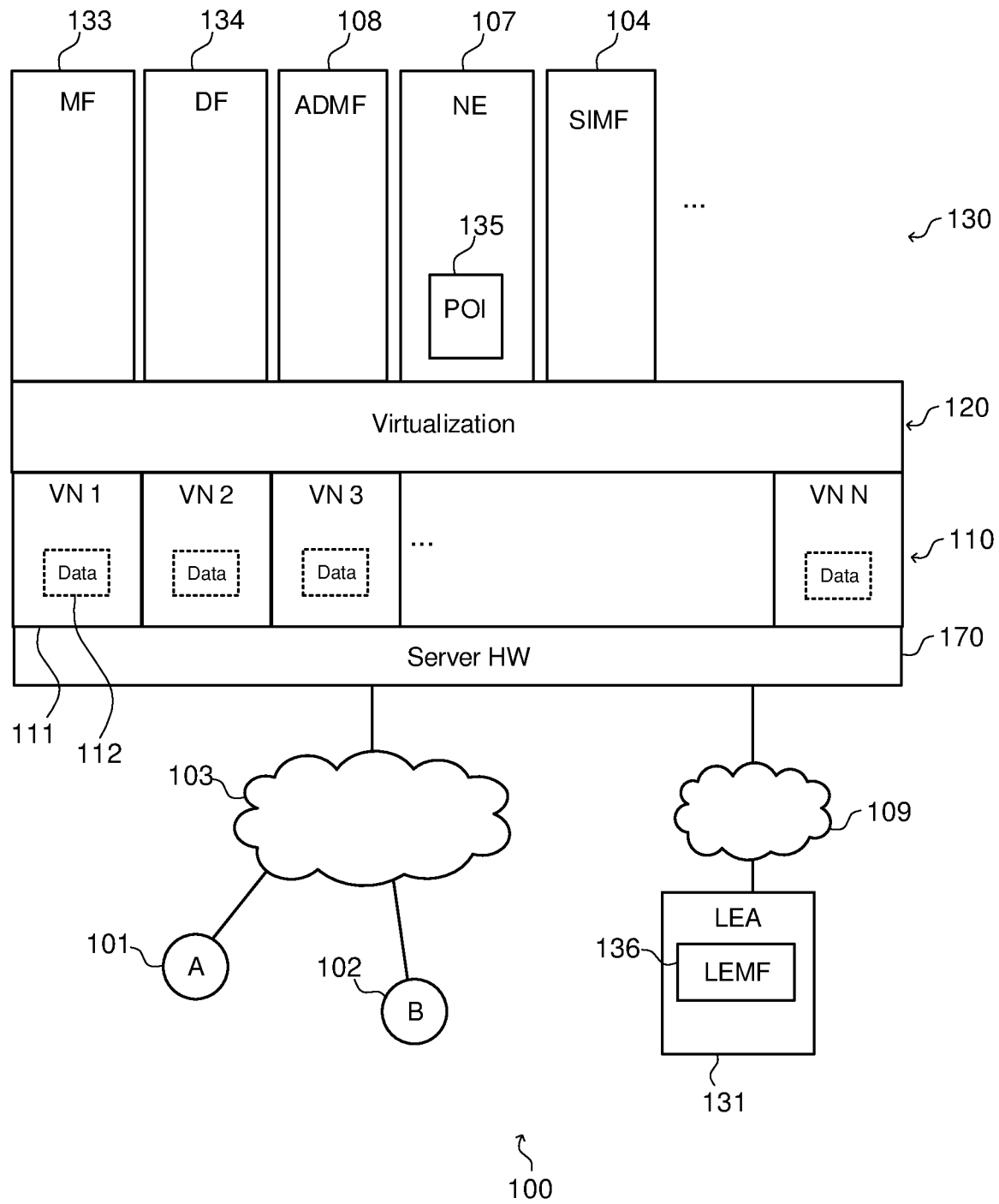

FIG. 1b schematically illustrates the telecommunication network 100 as it is realized using hardware wherein VNFs are executed on virtual nodes 110 that utilize a hardware server platform 170. The MF 133, the DF 134, the ADMF 108, the NE 107, the POI 135 and the SIMF 104 are realized in a functional layer 130 of VNFs that execute in the virtual nodes 110 via a virtualization layer 120. For example, a virtual node 111 is a collection of software instructions as well as associated data 112 as the skilled person will realize. The LEA 131 with its LEMF 136 is connected to the hardware platform 170 via an intermediate network 109, the details of which are outside the scope of the present disclosure. Although not explicitly illustrated in FIG. 1b, communication between entities via the X1, X2, X3, HI1, HI2 and HI3 interfaces take place as described above in connection with FIG. 1a.

Turning now to FIGS. 2a-b and FIGS. 3a-c, and with continued reference to FIGS. 1a-b, embodiments of methods in the telecommunication network 100 will be described in some more detail. The embodiments will exemplify how the various functional units and interfaces described above may be enhanced in order to provide the effect and advantages associated with LI service interruptions.

Figure 2A:
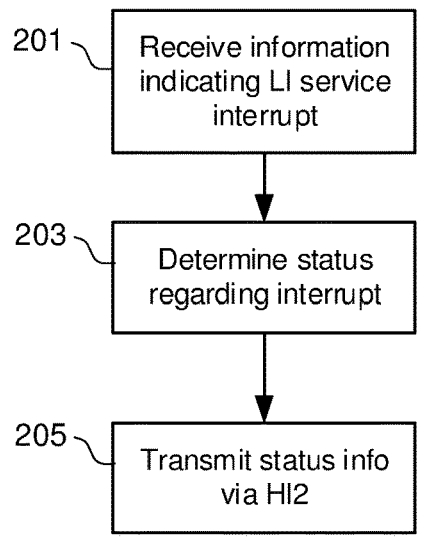
FIGS. 2a-b are flowcharts of methods.

FIG. 2a illustrates a method that comprises actions performed by the SIMF 104 in the telecommunication network 100 introduced and described above in connection with FIGS. 1a-b:

Action 201

The SIMF 104 receives information that indicates that LI service interruption associated with an LI task has occurred.

The receiving in action 201 may comprise receiving information that indicates that the POI 135 in the NE 107 has experienced LI service interruption associated with an LI task.

Figure 3A:
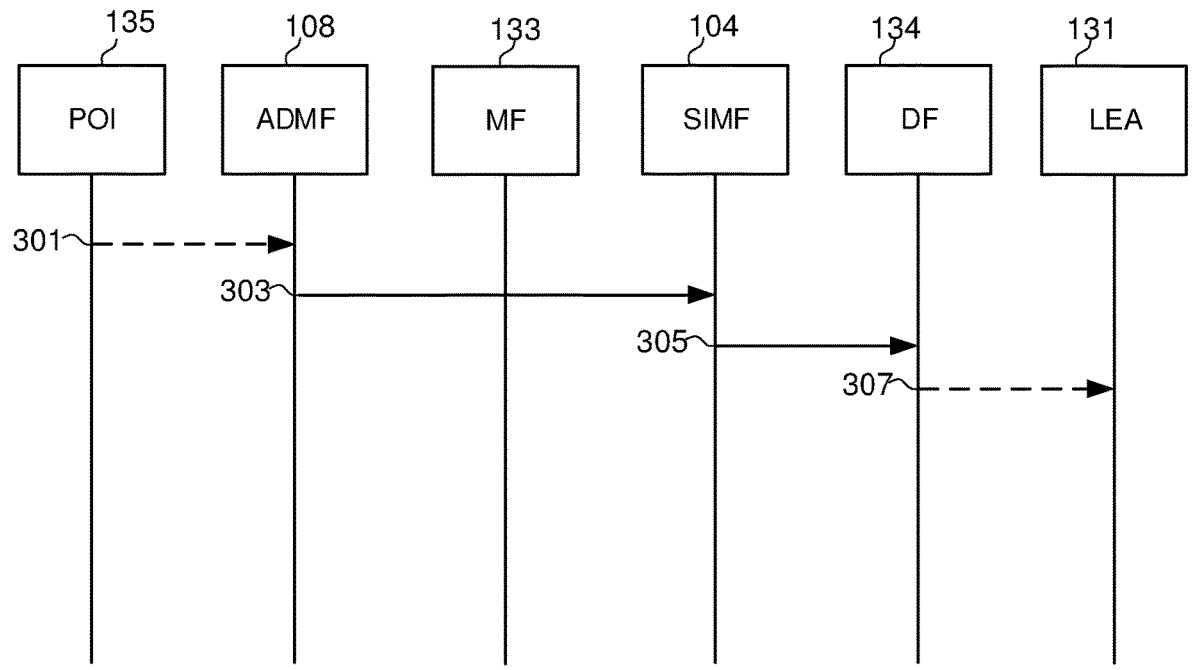
FIGS. 3a-c are signaling diagrams illustrating signals transmitted in the methods illustrated in FIGS. 2a-b,
FIGS. 4a-c are flowcharts of methods,
FIG. 5 schematically illustrates a computer system, and
FIG. 6 schematically illustrates a computer system.

As exemplified in FIG. 3a, the reception may comprise receiving, from the ADMF 108 via an X1 interface, a message 303 comprising the information that the POI 135 has experienced LI service interruption associated with an LI task.

Figure 3B:
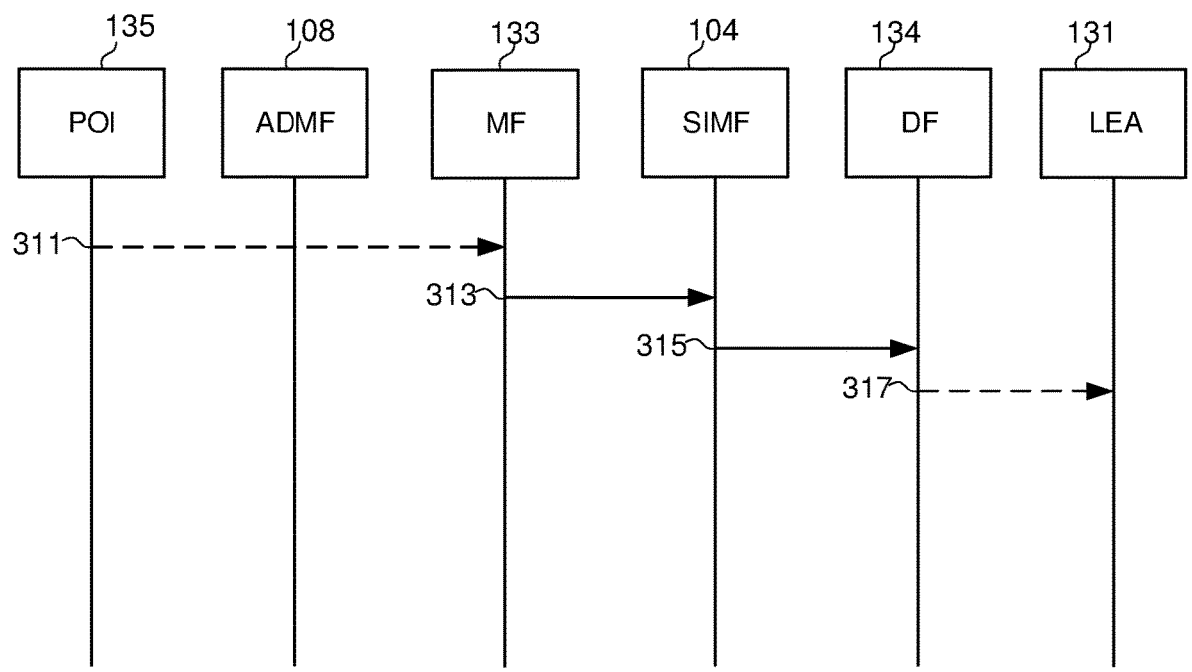

As exemplified in FIG. 3b, the reception may comprise receiving, from the MF 133 via an X2 interface, a message 313 comprising the information that the POI 135 has experienced LI service interruption associated with an LI task.

In other words, such embodiments illustrate that handling of occurrences of LI service interruption may involve handling of interruptions occurring outside the LI mediation system 106, e.g. interruptions relating to the LI monitoring by the POI 135.

Alternatively, the receiving in action 201 may comprise receiving, from the ADMF 108, via the X1 interface, information that indicates that LI service interruption associated with an LI task has occurred. In other words, such embodiments illustrate that handling of occurrences of LI service interruption may involve handling of one or more interruptions occurring inside the LI mediation system 106 itself, e.g. an interruption in the ADMF 108, the MF 133 or the DF 134.

Action 203

The SIMF 104 determines, based on the information received in action 201, a status regarding the LI service interruption associated with the LI task.

For example, the determination in action 203 may comprise determining whether the LI service interruption associated with the LI task has a current status that is any of terminated, ongoing or initiated.

In other words, the status indicating that the LI service interruption has terminated means that the POI 135 has experienced LI service interruption that has been terminated. Furthermore, the status indicating that the LI service interruption is ongoing means that the POI 135 has experienced LI service interruption that is ongoing, and the status indicating that the LI service interruption is initiated means that the POI 135 has experienced LI service interruption during initiation.

Action 205

The SIMF 104 transmits, to the DF 134 via the HI2 interface, a message 305, 315 comprising at least the determined (in action 203) status regarding the LI service interruption.

The reception in action 201 may comprise receiving further LI service interruption information that informs about one or more effects of the LI service interruption. Such further LI service interruption information may comprise one or more of:

information that indicates a type of the LI service interruption, for example internal LI mediation system 106 interruptions such as a restart of the ADMF or the MF, or a lost connection with the NE, as well as interruptions experienced by the POI 135 in the NE such as restart of the NE, loss of NE database, microservice restart etc., information that indicates a status of at least one entity involved in the LI task that experiences the LI service interruption, for example whether an entity is up and running or whether it is down, and information that indicates an impact on at least one entity involved in the LI task that experiences the LI service interruption. In other words, such service interruption information exemplifies effects of LI service interruption such as restart of a POI, loss of connection between a POI and an MF etc.

Impact on an entity due to LI service interruption may vary to a large extent. Some ongoing events will not be terminated or part of the event can be lost, and for some ongoing events some of the related IRI's may be lost or not received by the MF 133, and some events sending is delayed, some/all events were lost or some events will be lost. Also, new warrants for LI received from the LEA cannot be accepted (temporarily). Here, "event" means the IRI/CC reporting information from the DF 134 to the LEA 131 about the activity of a target 101, 102 for LI. For example, in case of a call monitored between the first and second communicating entities 101, 102 there should be at least three IRIs: call attempt, call answer and call completion. If the NE 135 restarts it is possible that the call completion will not be generated. For the NE 135 restart time, no new events are generated. If the NE database is lost, during the time LI repopulates the NE database, the events could be not monitored. During ADMF restart, no new warrants for LI can be accepted and during DF/MF 133, 134 restart no IRI can be sent (as they will be delayed or lost).

The transmission in action 205 to the DF 134 may comprise transmission of at least part of the further LI service interruption information exemplified above.

The determination in action 203 of a status regarding the LI service interruption associated with the LI task may comprise analysing at least part of the further LI service interruption information exemplified above. For example, now with reference to FIG. 2b, the determination in action 203 may comprise actions 211, 213 and 215 as will be described in the following:

Action 211

A determination is made, based on the received further LI service interruption information, that the one or more effects of the LI service interruption has not terminated.

Action 213

As a consequence of the determination in action 211, a determination is then made, based on the received further LI service interruption information, that the one or more effects of the LI service interruption is not ongoing.

Action 215

As a consequence of the determination in action 213, the LI service interruption status is then set to initiated.

Figure 2B:
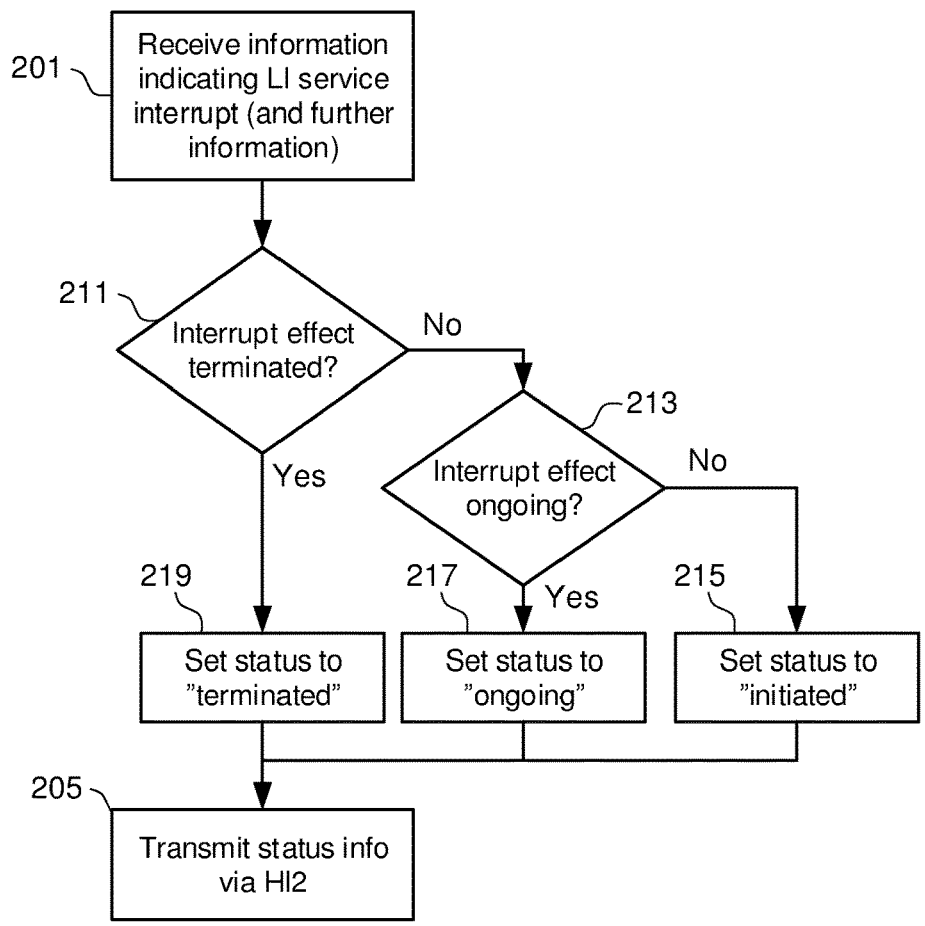

Alternatively, as illustrated in FIG. 2b, the determination in action 203 may comprise actions 211, 213 and 217 as will be described in the following:

Action 211

A determination is made, based on the received further LI service interruption information, that the one or more effects of the LI service interruption has not terminated.

Action 213

As a consequence of the determination in action 211, a determination is then made, based on the received further LI service interruption information, that the one or more effects of the LI service interruption is ongoing.

Action 217

As a consequence of the determination in action 213, the LI service interruption status is then set to ongoing.

Embodiments may involve an iteration of such determinations that the one or more effects of the LI service interruption is ongoing and such embodiments may comprise reception, in action 201, of updated further LI service interruption information and transmission, in action 205, to the DF 134 of this updated further LI service interruption information. An example of such an embodiment will be described in some more detail below in connection with FIG. 3c.

Alternatively, as illustrated in FIG. 2b, the determination in action 203 may comprise actions 211 and 219 as will be described in the following:

Action 211

A determination is made, based on the received further LI service interruption information, that the one or more effects of the LI service interruption has terminated.

Action 219

As a consequence of the determination in action 211, the LI service interruption status is then set to terminated.

The LI service interruption message transmitted in action 205 may be an OperationMessage of the ETSI technical specification 102 232 e.g. Version 1.5.1 or any of its corresponding LI service interruption message in a future ETSI technical specification.

Figure 3C:
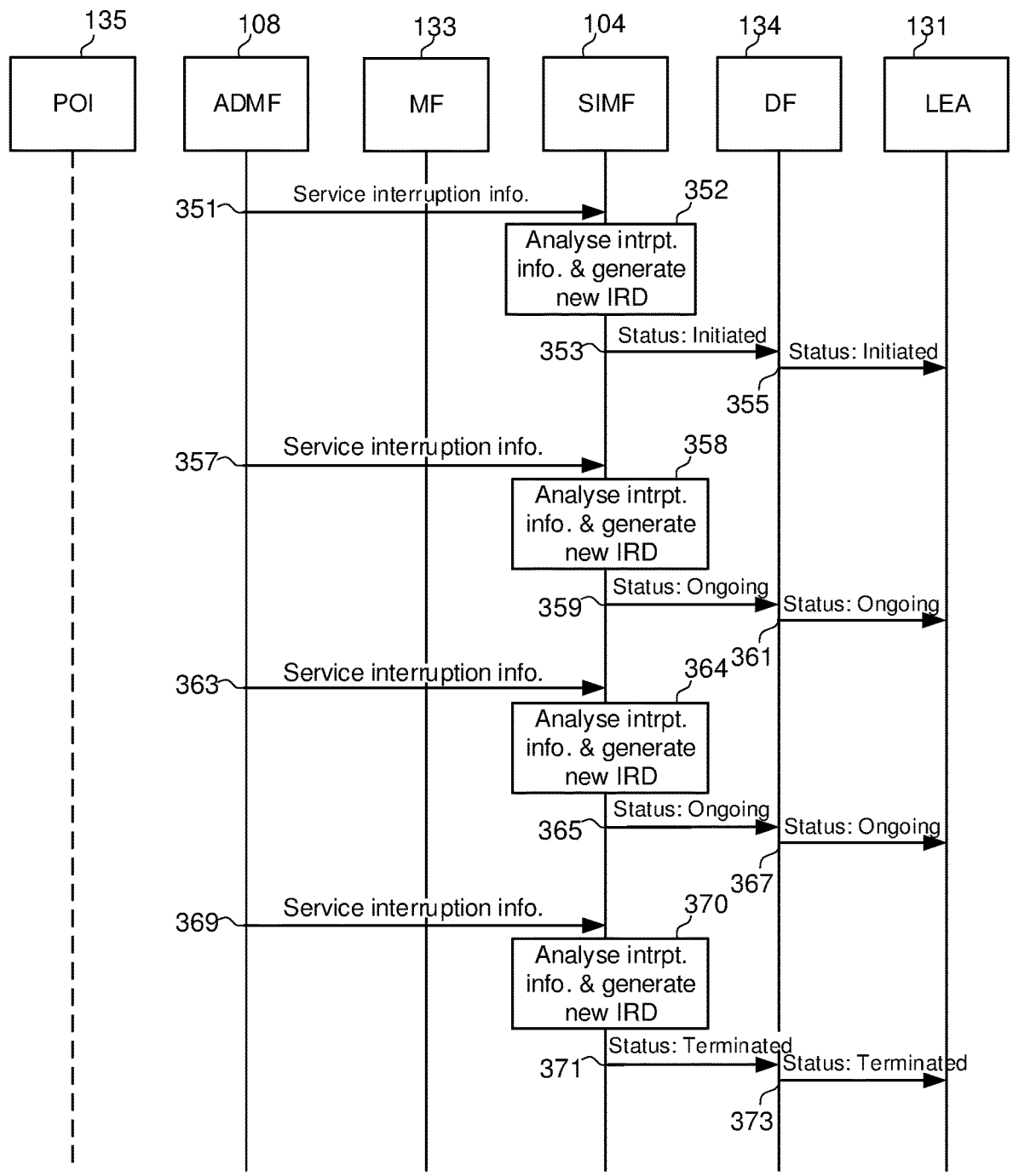

FIG. 3c illustrates an example wherein the ADMF 108 transmits, via the X1 interface, information 351 (denoted "Service interruption info. In FIG. 3c) to the SIMF 104 that informs the SIMF 104 of an LI service interruption that has occurred during LI performed by the POI 135 (for example, as a consequence of a report by the POI 135 to the ADMF 108, not illustrated in FIG. 3c). The information 351 is received and analysed by the SIMF 104. The analysis comprises a determination 352 that the LI service interruption has a status that represents the fact that the LI service interruption has been initiated. As a consequence of the determination that the LI service interruption has been initiated, the SIMF generates intercept related data (IRD) 353 that comprises the status information and transmits this IRD 353 via the HI2 interface to the DF 134, which in turn transmits the IRD 355 via the HI2 interface to the LEA 131.

As long as the POI 135 experiences LI service interruption and provides (not illustrated in FIG. 3c) information about this fact to the ADMF 108, the ADMF 108 transmits, via the X1 interface, information 357, 363 to the SIMF 104 that informs the SIMF 104 about the LI service interruption. The SIMF 104 determines 358, 364 from the received information 357, 363 that the LI service interruption has a status that represents the fact that the LI service interruption is still ongoing. As a consequence of the determination that the LI service interruption is ongoing, the SIMF 104 generates intercept related data 359, 365 that comprises the status information and transmits this IRD 359, 365 via the HI2 interface to the DF 134, which in turn transmits the IRD 361, 367 via the HI2 interface to the LEA 131.

Once the POI 135 no longer experiences LI service interruption it provides (not illustrated in FIG. 3c) information about this fact to the ADMF 108. The ADMF 108 then transmits, via the X1 interface, information 369 to the SIMF 104 that informs the SIMF 104 about the fact that LI service interruption is no longer experienced by the POI 135. The SIMF 104 determines 370 from the received information 369 that the LI service interruption has a status that represents the fact that the LI service interruption has terminated. As a consequence of the determination that the LI service interruption is terminated, the SIMF 104 generates intercept related data 371 that comprises the status information and transmits this IRD 371 via the HI2 interface to the DF 134, which in turn transmits the IRD 373 via the HI2 interface to the LEA 131.

The sequence of messages and actions exemplified in FIG. 3c illustrates a case where the POI 135 itself provides information, via the X1 interface, to the ADMF 108 about the fact that the POI 135 has experienced LI service interruption. In another exemplifying case, not illustrated in FIG. 3c, the SIMF 104 may be informed by the MF 133 by means of IRD transmitted via the X2 interface. In such a case, the SIMF 104 analyses the received IRD and determines that the LI service interruption has a status that represents the fact that the LI service interruption has been initiated, is ongoing or has been terminated, as already described above in connection with FIG. 3c. In another exemplifying case, the SIMF 104 is provided with the information 351, 357, 363, 369 by the ADMF 108 via the X1 interface about LI service interruption internal to the LI mediation system 106, as discussed above.

Turning now to FIGS. 4a-c and with continued reference to FIG. 1a and FIG. 1b, some use cases will now be described to further exemplify the management of lawful interception service interrupts. These use cases are specific examples of the more generic methods described above in connection with FIGS. 2a-b and 3a-c.

The NE 107 is deployed as a set of microservices that cooperate to fulfil a network function (e.g. handling a call between the communicating entities 101, 102) and send the interception related information (IRI) through the POI 135. As a normal function the SIMF 104 will receive from the MF 133 each H12 message that the MF 133 mediates from the IRI that the POI 135 sends to the MF 133 together with the POI address they originate from, using an internal X2 interface. The SIMF 104 extracts the correlation identity (ID) from the received IRI and keep track of the association between the correlation ID and the POI address. (Remembering that all interception notification reports (IRI) related to an intercepted session are correlated with each-other through a common correlation ID.) The SIMF 104 removes the correlation ID from the association when it detects that the call ends or when it does not receive IRI for that Correlation ID in a configurable time-period.

In a first use case, as illustrated in FIG. 4a, the POI 135 experiences a LI service interruption in the form of a restart when performing LI monitoring of the ongoing call between the communicating entities 101, 102. The ongoing call is entirely handled by the same POI. A sequence of actions may then evolve as follows:

Action 401

The ADMF 108 receives, on the X1 interface, an alarm for the restart of the POI 135, the alarm including also the Internet protocol (IP) address of the failing POI 135. In the context of what has been described above, such an alarm is information that indicates that the POI 135 in the NE 107 has experienced LI service interruption associated with an LI task.

Action 403

The ADMF 108 notifies the SIMF 104 about the POI 135 restarted together with the POI address. In other words, the SIMF 104 receives information that indicates that LI service interruption associated with an LI task has occurred.

Action 405

The SIMF 104 stores the IP address information about the restarted POI 135.

Action 407

Upon reception of IRI and POI IP address from the MF 133, the SIMF 104 extracts the correlation ID from the received IRI.

Action 409

The SIMF 104 checks the association and verifies that the correlation ID is already present with the same IP address. That is, if the POI IP address of the previously received IRI is equal to the POI IP address of the restarted POI, it means that the POI related to the correlation ID experienced a failure, and the IRI is enriched as described in action 411.

Action 411

In case the correlation is verified in action 409, the SIMF 104 enriches the IRI received from the MF 133 with the information of "Potential Loss of Data" and transmits this IRI to the DF 134. In case no correlation is verified in action 409, the received IRI is transmitted to the DF 134. In other words, the status regarding the LI service interruption is determined and transmitted to the DF 134. In any case, the SIMF 104 updates the POI address and correlation ID from the association.

In a second use case, as illustrated in FIG. 4b, the POI 135 has experienced a LI service interruption in the form of a crash when performing LI monitoring of the ongoing call between the communicating entities 101, 102. The ongoing call is no longer reported. A sequence of actions may then evolve as follows:

Action 431

The ADMF 108 receives, on the X1 interface, an alarm for the crash of the POI 135, the alarm also including the IP address of the failing POI 135. As mentioned above, in the context of what has been described above, such an alarm is information that indicates that the POI 135 in the NE 107 has experienced LI service interruption associated with an LI task.

Action 433

The ADMF 108 notifies the SIMF 104 about the POI 135 crashed together with the POI address. In other words, the SIMF 104 receives information that indicates that LI service interruption associated with an LI task has occurred.

Action 435

The SIMF 104 stores the IP address information about the crashed POI 135.

Action 437

The SIMF 104 awaits IRI reception from the MF 133 and a timeout occurs due to no reception of IRI from the MF 133 (having information that the POI 135 has crashed and is no longer performing LI monitoring).

Action 439

When the SIMF 104 removes the correlation ID from the internal association due to time-out on IRI reception, the SIMF 104 checks if the correlation ID is associated with the crashed POI 135. That is, if the POI IP address of the previously received IRI is equal to the POI IP address of the crashed POI, it means that the POI related to the correlation ID experienced a failure, and the IRI is created as described in action 441.

Action 441

In case the correlation ID is associated with the crashed POI 135 as checked in the previous step, the SIMF 104 generates an IRI and provides the generated IRI with the information of "Loss of Data" and transmits this IRI to the DF 134. In other words, the status regarding the LI service interruption is determined and transmitted to the DF 134.

In a third use case, as illustrated in FIG. 4c, the POI 135 has experienced a LI service interruption in the form of a crash when performing LI of the ongoing call between the communicating entities 101, 102. The ongoing call is subsequently handled by another POI (not illustrated in FIGS. 1a and 1b). A sequence of actions may then evolve as follows:

Action 471

The ADMF 108 receives, on the X1 interface, an alarm for the crash of the POI 135, the alarm also including the IP address of the failing POI 135. As mentioned above, in the context of what has been described above, such an alarm is information that indicates that the POI 135 in the NE 107 has experienced LI service interruption associated with an LI task.

Action 473

The ADMF 108 notifies the SIMF 104 about the POI 135 crashed together with the POI address. In other words, the SIMF 104 receives information that indicates that LI service interruption associated with an LI task has occurred.

Action 475

The SIMF 104 stores the IP address information about the crashed POI 135.

Action 477

Upon reception of IRI and POI IP address of the other POI (not illustrated in FIGS. 1a and 1b) from the MF 133, the SIMF 104 extracts the correlation ID from the IRI.

Action 479

The SIMF 104 checks the association and verifies that the correlation ID is already present with a different IP address of the other POI (not illustrated in FIGS. 1a and 1b). That is, if the POI IP address of the previously received IRI is equal to the POI IP address of the crashed POI, it means that the POI related to the correlation ID experienced a failure, and the IRI is enriched as described in action 481.

Action 481

The SIMF 104 enriches the IRI from the MF 133 with the information of "Potential Loss of Data" and transmits this IRI to the DF 134. In other words, the status regarding the LI service interruption is determined and transmitted to the DF 134.

Action 483

The SIMF 104 updates the association between correlation ID and new IP address of the other POI (not illustrated in FIGS. 1a and 1b).

Figure 5:
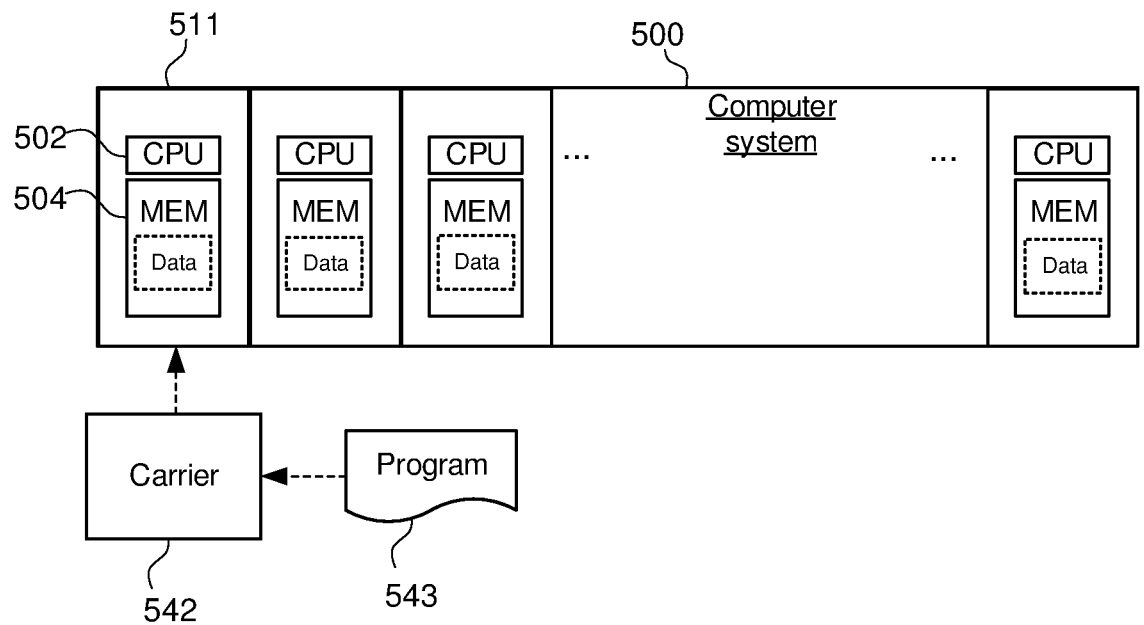

Turning now to FIG. 5, and with continued reference to FIGS. 1-4, a computer system 500 will be described in some detail. The computer system 500, which may correspond to at least part of the telecommunication network 100, comprises at least a processor 502 and a memory 504. The memory 504 contains instructions executable by the processor 502 whereby the computer system 500 is operative to:
  receive information that indicates that LI service interruption associated with an LI task has occurred,
  determine, based on the received information, a status regarding the LI service interruption associated with the LI task, and
  transmit, to a delivery function (DF) via an HI2 interface, a message comprising at least the determined status regarding the LI service interruption.

In some embodiments, the computer system 500 comprises one or more compute hosts 511, said one or more compute hosts 511 comprising at least a processor 502 and a memory 504.

The instructions that are executable by the processor 502 may be software in the form of a computer program 543. The computer program 543 may be contained in or by a carrier 542, which may provide the computer program 543 to the memory 504 and processor 502. The carrier 542 may be in any suitable form including an electronic signal, an optical signal, a radio signal or a computer readable storage medium.

In some embodiments, the computer system 500 is operative such that the determining comprises determining whether the LI service interruption associated with the LI task has a current status that is any of: terminated, ongoing or initiated.

In some embodiments, the computer system 500 is operative such that the receiving comprises receiving information that indicates that a point of interception (POI) in a network element (NE) has experienced LI service interruption associated with an LI task.

In some embodiments, the computer system 500 is operative such that the receiving comprises receiving, from an administrative function (ADMF), via an X1 interface, a message comprising the information that the POI has experienced LI service interruption associated with an LI task.

In some embodiments, the computer system 500 is operative such that the receiving comprises receiving, from a mediation function (MF), via an X2 interface, a message comprising the information that the POI has experienced LI service interruption associated with an LI task.

In some embodiments, the computer system 500 is operative such that the receiving comprises receiving, from an ADMF, via an X1 interface, information that indicates that LI service interruption associated with an LI task has occurred.

In some embodiments, the computer system 500 is operative such that the receiving comprises receiving further LI service interruption information that informs about one or more effects of the LI service interruption, said further LI service interruption information comprising one or more of:
  information that indicates a type of the LI service interruption,
  information that indicates a status of at least one entity involved in the LI task that experiences the LI service interruption, and
  information that indicates an impact on at least one entity involved in the LI task that experiences the LI service interruption.

In some embodiments, the computer system 500 is operative such that the transmitting to the DF comprises transmission of at least part of the further LI service interruption information.

In some embodiments, the computer system 500 is operative such that the determining a status regarding the LI service interruption associated with the LI task comprises analysing at least part of the further LI service interruption information.

In some embodiments, the computer system 500 is operative to:
  determine, based on the received further LI service interruption information, that the one or more effects of the LI service interruption has not terminated,
  determine, based on the received further LI service interruption information, that the one or more effects of the LI service interruption is not ongoing, and
  set the LI service interruption status to initiated.

In some embodiments, the computer system 500 is operative to:
  determine, based on the received further LI service interruption information, that the one or more effects of the LI service interruption has not terminated,
  determine, based on the received further LI service interruption information, that the one or more effects of the LI service interruption is ongoing, and
  set the LI service interruption status to ongoing.

In some embodiments, the computer system 500 is operative such that the receiving comprises receiving updated further LI service interruption information, and the transmitting to the DF comprises transmission of the updated further LI service interruption information.

In some embodiments, the computer system 500 is operative to:
- determine, based on the received further LI service interruption information, that the one or more effects of the LI service interruption has terminated, and
- set the LI service interruption status to terminated.

In some embodiments, the computer system 500 is operative such that the LI service interruption message is an OperationMessage of the European Telecommunications Standards Institute (ETSI) technical specification 102 232 V1.5.1.

Figure 6:
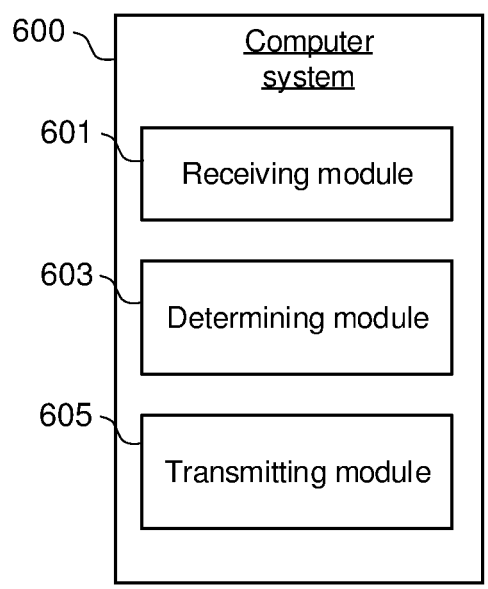

Turning now to FIG. 6, and with continued reference to FIGS. 1 to 5, a computer system 600 will be described in some detail. The computer system 600 comprises:
- a receiving module (601) configured to receive information that indicates that LI service interruption associated with an LI task has occurred,
- a determining module (603) configured to determine, based on the received information, a status regarding the LI service interruption associated with the LI task, and
- a transmitting module (605) configured to transmit, to a delivery function (DF) via an HI2 interface, a message comprising at least the determined status regarding the LI service interruption.

The computer system 600 may comprise further modules that are configured to perform in a similar manner as, e.g., a computer system 500 described above in connection with FIG. 5.

The invention claimed is:

1. A method for enabling a delivery function, DF, to convey information about a lawful interception, LI, service interruption to a law enforcement agency, LEA, the method performed by a computer system comprising a LI, service interruption manager function, SIMF, in a telecommunication network, the method comprising:
   receiving information that indicates that LI service interruption associated with an LI task has occurred,
   determining, based on the received information, whether a status regarding the LI service interruption associated with the LI task has a current status that is any of: terminated, ongoing, or initiated, and
   transmitting, to a delivery function, DF, via an HI2 interface, a message comprising at least the determined status regarding the LI service interruption.

2. The method of claim 1, wherein the receiving comprises receiving information that indicates that a point of interception, POI, in a network element, NE, has experienced LI service interruption associated with an LI task.

3. The method of claim 2, wherein the receiving comprises receiving, from an administrative function, ADMF, via an X1 interface, a message comprising the information that the POI has experienced LI service interruption associated with an LI task.

4. The method of claim 2, wherein the receiving comprises receiving, from a mediation function, MF, via an X2 interface, a message comprising the information that the POI has experienced LI service interruption associated with an LI task.

5. The method of claim 1, wherein the receiving comprises receiving, from an administrative function, ADMF, via an X1 interface, information that indicates that LI service interruption associated with an LI task has occurred.

6. The method of claim 1, wherein the receiving comprises receiving further LI service interruption information that informs about one or more effects of the LI service interruption, said further LI service interruption information comprising one or more of:
   information that indicates a type of the LI service interruption,
   information that indicates a status of at least one entity involved in the LI task that experiences the LI service interruption, and
   information that indicates an impact on at least one entity involved in the LI task that experiences the LI service interruption.

7. The method of claim 6, wherein the transmitting to the DF comprises transmission of at least part of the further LI service interruption information.

8. The method of claim 6, wherein the determining a status regarding the LI service interruption associated with the LI task comprises analysing at least part of the further LI service interruption information.

9. The method of claim 8, comprising:
   determining, based on the received further LI service interruption information, that the one or more effects of the LI service interruption has not terminated,
   determining, based on the received further LI service interruption information, that the one or more effects of the LI service interruption is not ongoing, and
   setting the LI service interruption status to initiated.

10. The method of claim 8, comprising:
    determining, based on the received further LI service interruption information, that the one or more effects of the LI service interruption has not terminated,
    determining, based on the received further LI service interruption information, that the one or more effects of the LI service interruption is ongoing, and
    setting the LI service interruption status to ongoing.

11. The method of claim 10, wherein:
    the receiving comprises receiving updated further LI service interruption information, and
    the transmitting to the DF comprises transmission of the updated further LI service interruption information.

12. The method of claim 8, comprising:
    determining, based on the received further LI service interruption information, that the one or more effects of the LI service interruption has terminated, and
    setting the LI service interruption status to terminated.

13. The method of claim 1, wherein the LI service interruption message is:
    an OperationMessage of the European Telecommunications Standards Institute, ETSI, technical specification 102 232 V1.5.1.

14. A computer system comprising at least a processor and a memory, said memory containing instructions executable by said processor whereby said computer system is operative to perform a method for enabling a delivery function, DF, to convey information about a lawful interception, LI, service interruption to a law enforcement agency, LEA, the method performed by a computer system comprising a LI, service interruption manager function, SIMF, in a telecommunication network, the method comprising:
    receiving information that indicates that LI service interruption associated with an LI task has occurred,
    determining, based on the received information, whether a status regarding the LI service interruption associated with the LI task has a current status that is any of: terminated, ongoing, or initiated, and
    transmitting, to a delivery function, DF, via an HI2 interface, a message comprising at least the determined status regarding the LI service interruption.

15. The computer system of claim 14, comprising one or more compute hosts, said one or more compute hosts comprising at least a processor and a memory.

16. A non-transitory computer readable storage medium which comprises a computer program comprising instructions which, when executed on at least one processor in a computer system, cause the computer system to carry out a method for enabling a delivery function, DF, to convey information about a lawful interception, LI, service interruption to a law enforcement agency, LEA, the method performed by a computer system comprising a LI, service interruption manager function, SIMF, in a telecommunication network, the method comprising:
    receiving information that indicates that LI service interruption associated with an LI task has occurred,
    determining, based on the received information, whether a status regarding the LI service interruption associated with the LI task has a current status that is any of: terminated, ongoing, or initiated, and
    transmitting, to a delivery function, DF, via an HI2 interface, a message comprising at least the determined status regarding the LI service interruption.

\* \* \* \* \*